(12) United States Patent
Ichimura (10) Patent No.: US 6,222,814 B1
(45) Date of Patent: Apr. 24, 2001

(54) RECORDING/REPRODUCING APPARATUS AND METHOD FOR PHASE-CHANGE OPTICAL DISC

(75) Inventor: Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/237,531

(22) Filed: Jan. 27, 1999

(30) Foreign Application Priority Data

Jan. 30, 1998 (JP) .................................................. 10-019957

(51) Int. Cl.⁷ ........................................................ G11B 7/00
(52) U.S. Cl. ............................................. 369/116; 369/59
(58) Field of Search ........................... 369/116, 59, 54, 369/13; 372/31, 33, 38.02

(56) References Cited

U.S. PATENT DOCUMENTS

| 4,796,250 | * | 1/1989 | Kobayashi et al. | 369/116 |
|---|---|---|---|---|
| 4,845,720 | * | 7/1989 | Koishi et al. | 372/31 |
| 5,059,780 | * | 10/1991 | Kakuta | 369/116 |
| 5,457,666 | | 10/1995 | Toda et al. . | |
| 5,477,557 | * | 12/1995 | Inaba et al. | 372/38.02 |
| 5,490,126 | * | 2/1996 | Furumiya et al. | 369/59 |
| 5,495,463 | * | 2/1996 | Akagi et al. | 369/116 |
| 5,636,179 | * | 6/1997 | Tateishi | 369/54 |
| 5,642,343 | | 6/1997 | Toda et al. . | |
| 5,798,992 | * | 8/1998 | Kaneko et al. | 369/116 |
| 5,974,021 | | 10/1999 | Toda et al. . | |

FOREIGN PATENT DOCUMENTS

| 0 552 936 | 7/1993 | (EP) . |
|---|---|---|
| 0 851 413 | 7/1998 | (EP) . |
| 9-330519 | 12/1997 | (JP) . |

\* cited by examiner

*Primary Examiner*—Thang V. Tran
(74) *Attorney, Agent, or Firm*—Frommer Lawrence & Haug, LLP.; William S. Frommer (57) ABSTRACT

The data selector 59 provides the recording signal Data 1 as LD recording signal LD Data 1 and the output control signal Data 3' as LD recording signal LD Data 3, and fixes the LD recording signal LD Data 2 to H level. The S&H select circuit 58 supplies an inverted one of the NRZI signal to the enable terminal of the sample and hold circuit 53. The sample and hold circuit 53 samples an output of the bias power 1 part and supplies it as LD control signal LDC 2 to the APC circuit 55. Thus, the bias power 1 being a light power of the multi-pulse is sampled by the sample and hold circuit 53 and controlled by the APC circuit 55 as will be discussed later.

8 Claims, 8 Drawing Sheets

RECORDING/REPRODUCING APPARATUS AND METHOD FOR PHASE-CHANGE OPTICAL DISC

BACKGROUND OF THE INVENTION

1. Field of the Invention

The present invention relates to a phase-change drive of a high transfer rate, and more particularly, to a phase-change optical disc drive with a semiconductor laser power control and a method of writing/reading a phase-change optical disc at a high transfer rate by controlling the laser power of the semiconductor laser.

2. Description of Related Art

Typical phase-change optical discs in which information can be rewritten include a so-called DVD-RAM. DVD-RAM adopts an EFM (Eight-to-Fourteen Modulation) method for signal modulation to drive a semiconductor laser to emit multi-pulses for generation of recording waveforms for marks of 3T to 11T.

Figure 1:
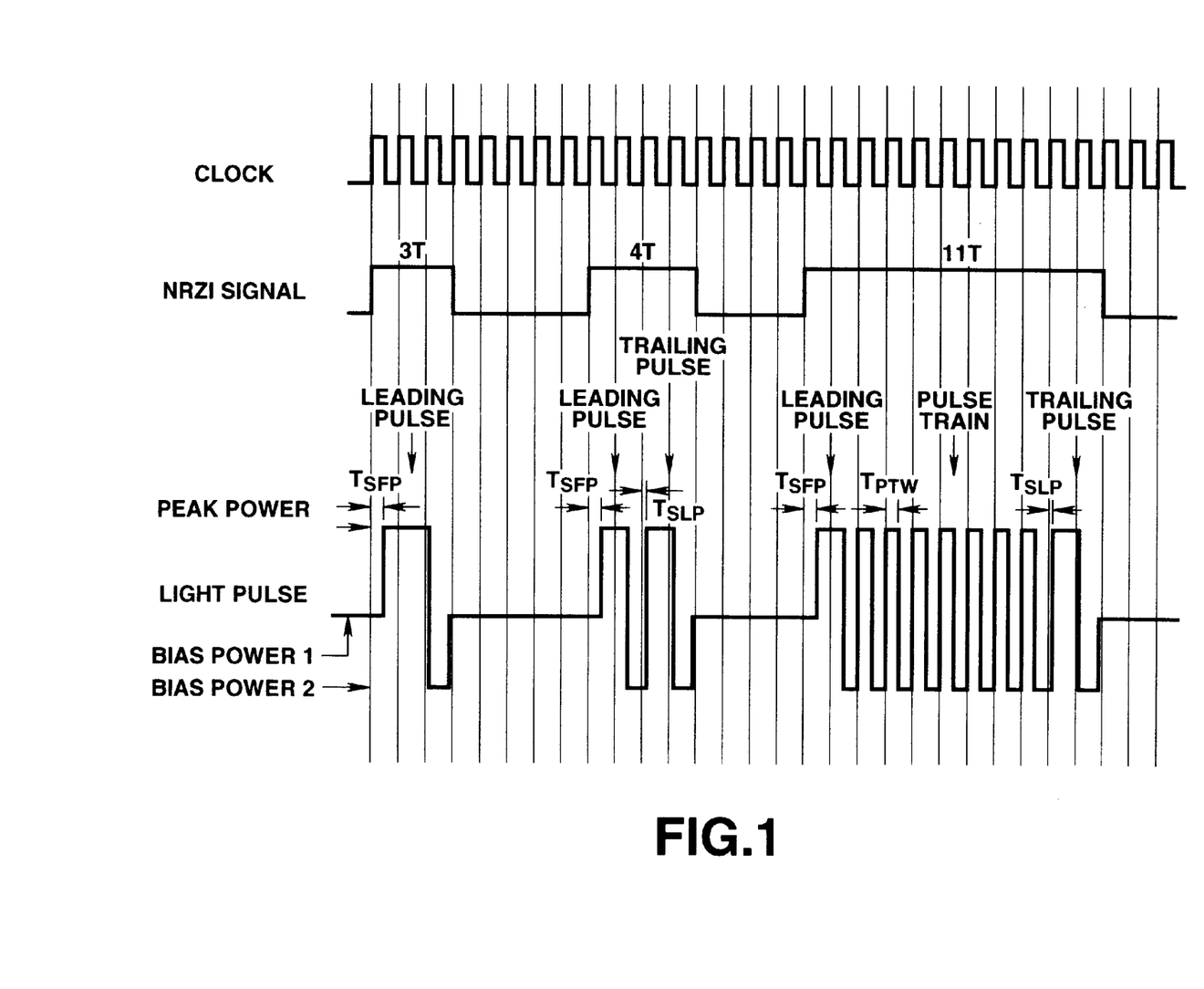
FIG. 1 is a timing chart of recording waveforms in DVD-RAM.

FIG. 1 is a timing chart of recording waveforms in DVD-RAM. As shown, a mark 3T is written with a single light pulse while a mark 11T is recorded with nine light pulses. Each light pulse is immediately followed by a bias power 2 set to a lower value than a bias power 1 corresponding to an erasure power to control the crystallization speed of the phase-changed recording medium. Further, both leading and trailing pulses have a period of about 1T, and they are generated with predetermined time delays ($T_{SFP}$ and $T_{SLP}$ in FIG. 1), respectively, from the clock pulse.

DVD-RAM uses a clock frequency of 29 MHz (user transfer rate of 11 Mbps). Both the leading and trailing pulses have a width of about 35 ns. The recording power of these light pulses is detected by a laser power monitoring detector, and then sampled and given a predetermined value, thus the recording pulse is controlled to always have a constant power. For example, the peak power is controlled by sampling the light power of the leading or trailing pulse, and the bias power 1 is controlled by sampling the light output of the multi-pulse. Note that the bias power 2 is controlled by sampling a reproducing output detected by an RF signal detector.

For a phase-change optical disc drive of a higher transfer rate than the normal one of DVD-RAM, however, it is necessary to increase the clock frequency. For a clock frequency of 100 MHz (use transfer rate of 38 Mbps), for example, the leading and trailing pulses will have a width of less than 10 ns, so it will be difficult to accurately sample the light output for controlling the recording power. Furthermore, wen the light pulse is less than 10 ns in width, it will easily be affected by noise component and also a sufficient band of the optical system cannot be assured, so that the recording power cannot be controlled.

SUMMARY OF THE INVENTION

Accordingly, the present invention has an object to overcome the above-mentioned drawbacks of the prior art by providing a phase-change optical disc writing/reading apparatus and method in which a laser power of a semiconductor laser can be accurately controlled even at the time of writing or reading a phase-change optical disc at a high transfer rate.

The above object can be attained by providing a phase-change optical disc drive in which a data of nT in pulse width is recorded with a multi-pulse generated from a semiconductor laser, including a number (n−1) of pulses and which shifts at a minimum of three levels, comprising according to the present invention:

means for detecting a laser power of the semiconductor laser; and means for generating, when in a power control mode, an output control pulse larger in pulse width than the multi-pulse to drive the semiconductor laser to generate a light pulse based on the output control pulse, sampling and holding, based on the output control pulse, the laser power detected by the detecting means, and controlling the laser power of the semiconductor laser so that the sampled and held laser power has a predetermined value.

When in the power control mode, the phase-change optical disc drive generates, when in the power control mode, an output control pulse larger in pulse width than the multi-pulse, drives the semiconductor laser based on the output control pulse to generate a light pulse, samples and holds, based on the output control pulse, the laser power detected by the detecting means, and controls the laser power of the semiconductor laser so that the sampled and held laser power has a predetermined value.

The above object can also be attained by providing a method of recording a data of nT in pulse width with a multi-pulse generated from a semiconductor laser, including a number (n−1) of pulses and which shifts at a minimum of three levels, comprising, according to the present invention, the steps of:

generating, when in a power control mode, an output control pulse larger in pulse width than the multi-pulse;

driving the semiconductor laser to generate a light pulse based on the output control pulse;

detecting a laser power of the semiconductor laser;

sampling and holding the detected laser power; and controlling the laser power of the semiconductor laser so that the sampled and held laser power has a predetermined value.

When in the power control mode, an output control pulse larger in pulse width than the multi-pulse is generated, and the semiconductor laser is driven based on the output control pulse to emit a light pulse, the laser power detected by the detecting means is sampled and held based on the output control pulse, and the laser power of the semiconductor laser is controlled so that the sampled and held laser power has a predetermined value.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 2:
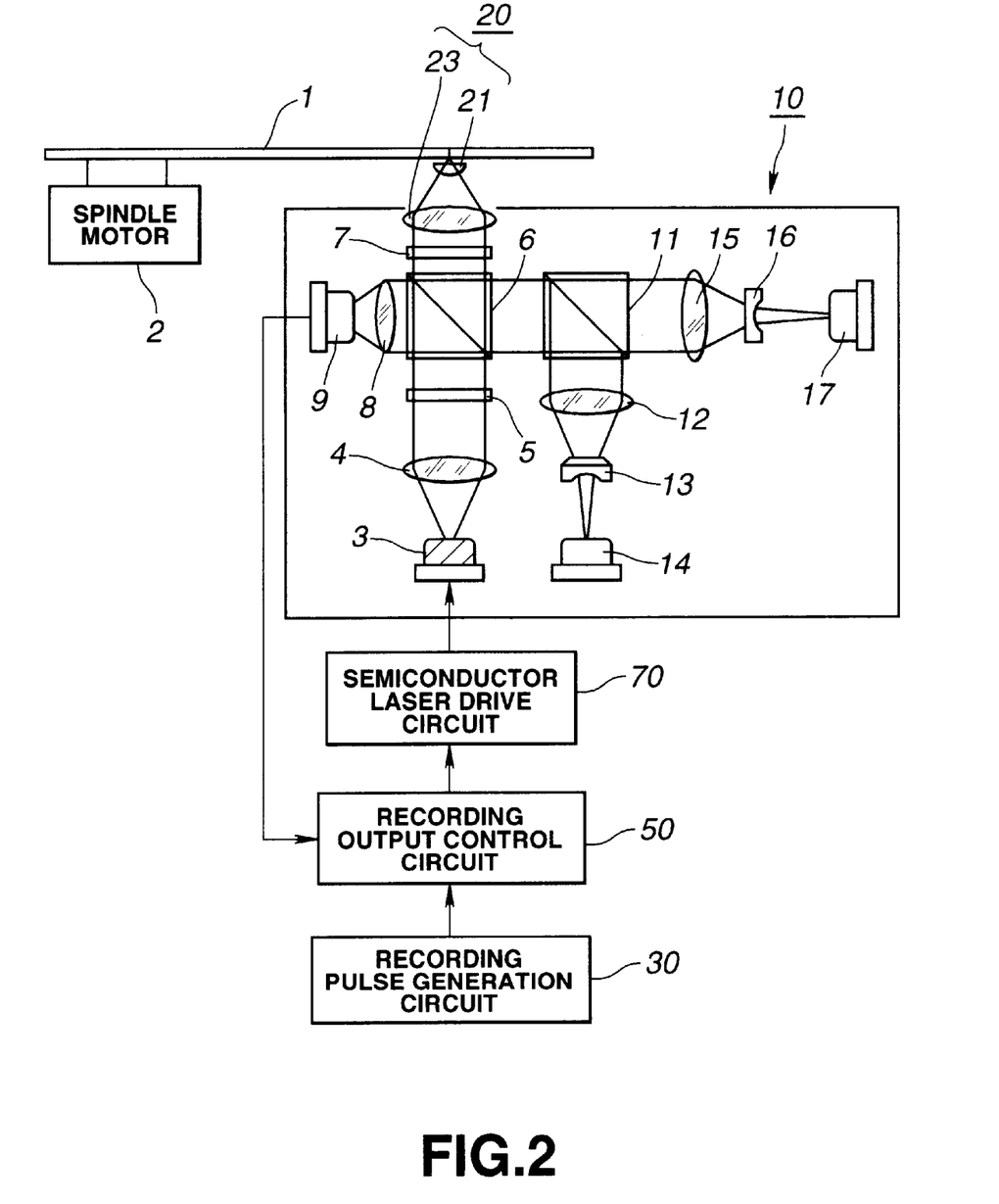
FIG. 2 is a schematic block diagram of a phase-change optical disc drive according to the present invention.

Referring now to FIG. 2, there is illustrated the rewritable phase-change optical disc drive according to the present invention. The optical disc drive uses a large numerical-aperture (NA) two-group objective lenses 21 and 23 as shown.

The phase-change optical disc drive according to the present invention includes an optical head 10, recording pulse generation circuit 30 to generate a recording pulse, recording output control circuit 50 to control the recording pulse output and a semiconductor laser drive circuit 70 to drive a semiconductor laser 3 which will be discussed later.

In the phase-change optical disc drive, the optical disc 1 is spun at a constant angular velocity, for example, by a spindle motor 2 while the information recording surface of the optical disc 1 is being scanned with a laser light by the optical head 10, to optically record/reproduce information through the (1,7) modulation.

The semiconductor laser (LD) 3 is included in the optical head 10 to generate a reading/writing laser light for irradiation onto the optical disc 1. The laser light from the semiconductor laser 3 is formed to be a parallel beam by a collimator lens 4, passes through a side spot generating diffraction grating 5, and through a beam splitter 6 and quadrature wavelength plate (QWP) 7 and then it is incident upon an aspheric two-group objective lens 20 which will focus the laser light on the information recording surface of the optical disc 1. A part of the laser output from the semiconductor laser 3 is reflected by the beam splitter 6 and led to a laser power monitoring detector 9 through a condenser lens 8. The reflected light from the optical disc 1 (namely, reproduced signal) is reflected by the beam splitter 6 and led to the detection light path while a part of the reflected light is reflected by a beam splitter 11, passed through a condenser lens 12 and cylindrical lens 13 and incident upon a servo signal detector 14 where it is converted to a current while the rest of the reflected light from the optical disc 1 is passed through lenses 15 and 16 and incident upon an RF signal detector 17 where it is converted to a current. In the optical head 10, the astigmatism is used to generate a focus error signal and also the differential pushpull method is used to generate a tracking error signal. In this embodiment, the two signal detectors 14 and 17 are used to detect servo error signal and reproduced RF signal, respectively. However, these signals can also be detected by a single detector.

Figure 3:
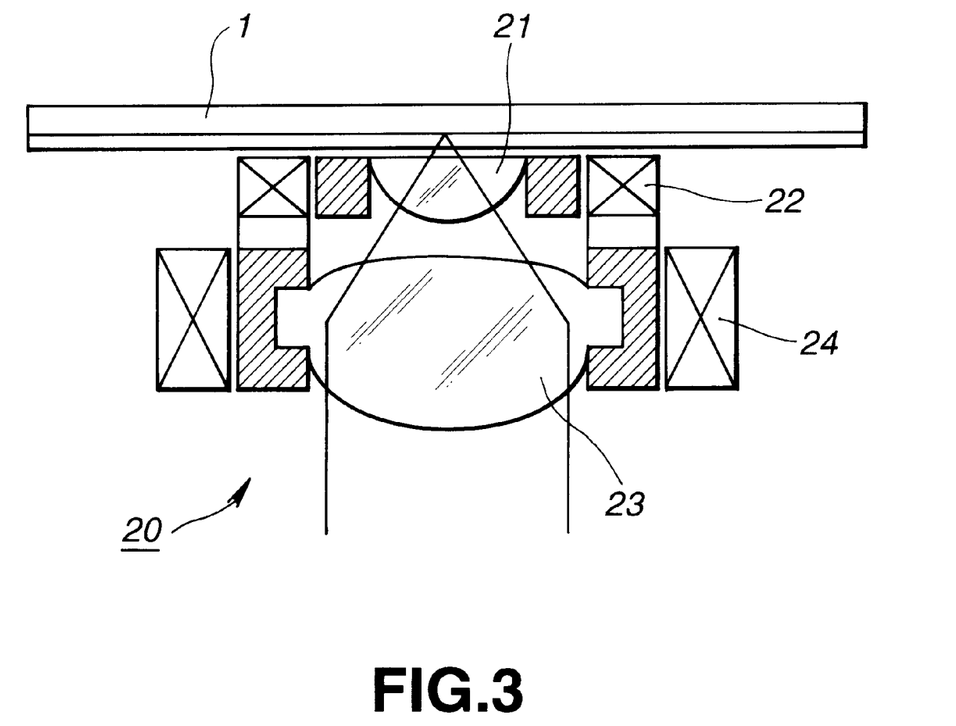
FIG. 3 illustrates the construction of an aspheric two-group objective lens unit used in the phase-change optical disc drive in FIG. 2.

As shown in FIG. 3, the aspheric two-group objective lens unit 20 includes a first electromagnetic actuator 22 to drive a first lens 21, and a second electromagnetic actuator 24 to drive a second lens 23. The second electromagnetic actuator 24 is movable in the optical-axial and tracking directions. The second lens 23 is mounted on the second electromagnetic actuator 24. The second lens 23 has an NA of about 0.5. The first lens 21 is provided above the second lens 23 and mounted on the first electromagnetic actuator 22 independent of the second electromagnetic actuator 23. The first lens 21 can be positioned on the optical axis.

The first lens 21 is movable together with the second lens 23 in the tracking direction to follow up with the tracking servo control. A light beam from the semiconductor laser 3 is passed through these two objective lenses 23 and 21 by which it is focused on the phase-change information recording surface of the optical disc 1. The effective NA of the two-group objective lenses 23 and 21 is about 0.85.

As the NA of the objective lenses increases, the skew tolerance of ordinary optical disc drive decreases. The wave front aberration due to disc skew (in X direction) can be represented using a Saidel's polynominal expression as follows:

$$W(x,y)=W_{22}X^2+W_{31}x(X^2+y^2)^2$$

where $W_{22}$: Astigmatism, $W_{31}$: Next coma and $W_{51}$: Quinary coma. Of these terms, the most dominant one $W_{31}$ can be given in the following expression:

$$W_{31}=(n^2-1)n^2\sin\theta\cos\theta/2(n^2-\sin^2\theta)^{2/5}\cdot tNA^3/\lambda$$

where n: refractive index of the disc substrate and t: Disc substrate thickness. When the skew angle is as small as less than 1°, the refractive index n is approximately a cube of the NA and proportional to the disc substrate thickness t.

Therefore, for the optical disc drive using the aspherical two-group objective lenses 23 and 21 whose NA is about 0.85, the disc substrate must be as thin as about 0.1 mm to assure a same skew tolerance as that of DVD-RAM.

Figure 4:
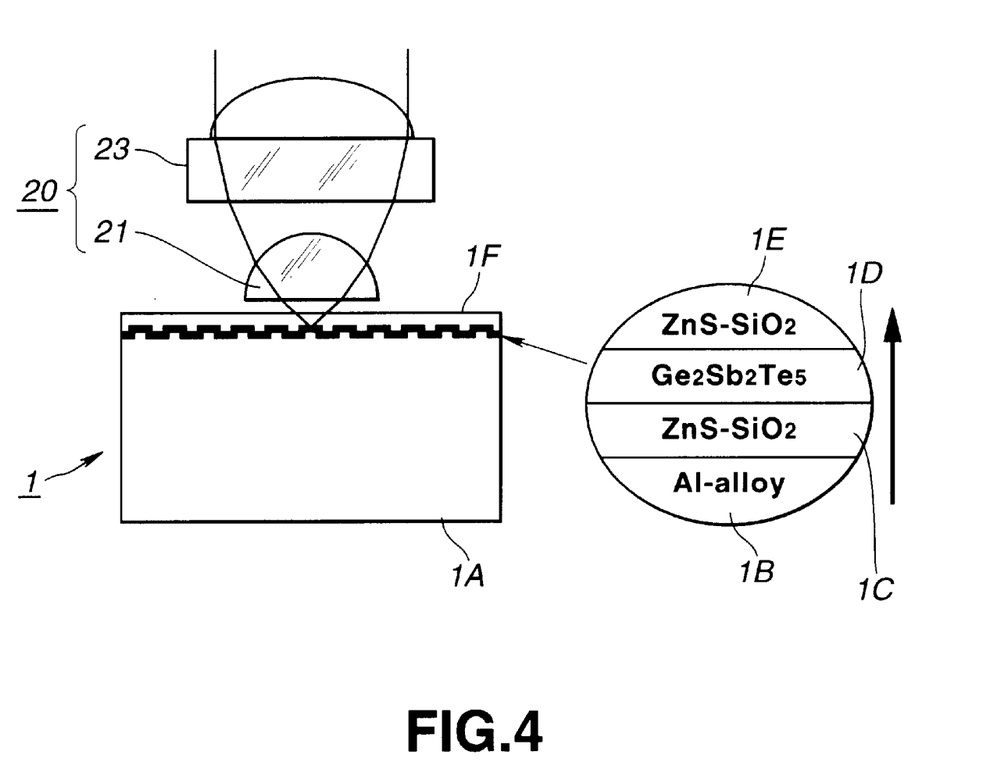
FIG. 4 schematically illustrates the construction of an optical disc compatible with the phase-change optical disc drive in FIG. 2.

On the other hand, to form a phase-change recording medium on the disc substrate, a first dielectric layer (ZnS—$SiO_2$), recording layer ($Ge_2Sb_2Te_5$), second dielectric layer (ZnS—$SiO_2$) and a aluminum reflective layer are formed in this order on a disc substrate. However, it is difficult to form the above layers on a disc substrate of 0.1 mm in thickness on which addresses and sector marks have been pre-formatted by embossing. To solve this problem, the optical disc 1 for use with the phase-change optical disc drive according to the present invention is produced by providing an aluminum reflective layer 1B, second dielectric layer 1C (ZnS—$SiO_2$)a, recording layer 1D ($Ge_2Sb_2Te_5$), first dielectric layer 1E (ZnS-$SiO_2$) and finally a disc protective layer 1F of 0.1 mm in thickness on a pre-formatted disc substrate 1A of 1.2 mm in thickness, as shown in FIG. 4. The order of forming the layers is opposite to that in production of the conventional optical disc.

The recording pulse generation circuit 30 generates recording signals Data 1, Data 2 and Data 3 for generation of light pulses and an output control signal Data 3'.

Figure 5:
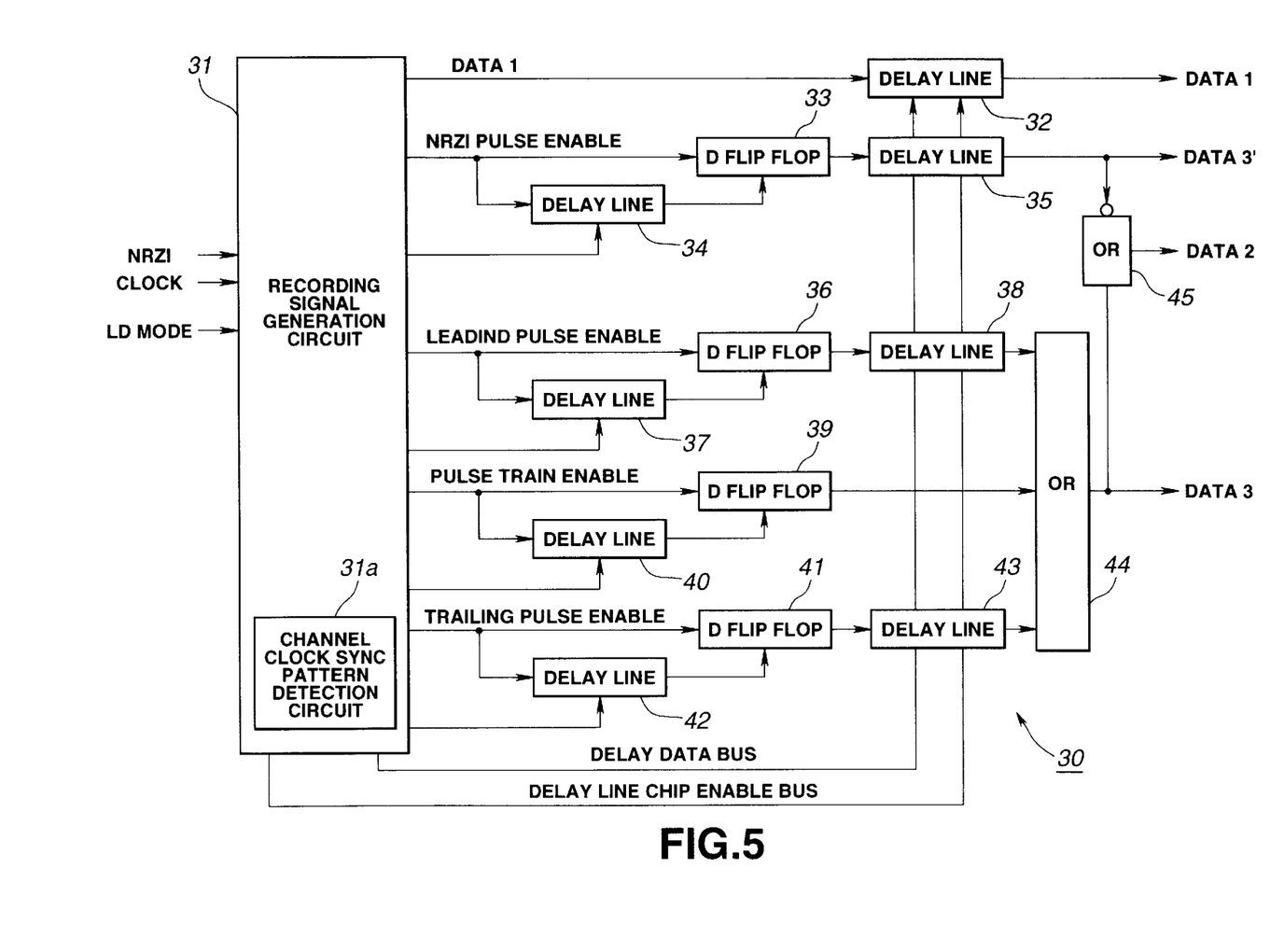
FIG. 5 is a schematic block diagram of a recording pulse generation circuit used in the phase-change optical disc drive in FIG. 2.

More particularly, the recording pulse generation circuit 30 comprises a recording signal generation circuit 31 as shown in FIG. 5. The recording signal generation circuit 31 generates five kinds of recording signals including the above recording signal Data 1, NRZI (No Return to Zero Inverse) pulse enable signal, leading pulse enable signal, pulse train enable signal, and trailing pulse enable signal.

The recording signal generation circuit 31 is switched between recording and reproduction modes by a CPU (not shown). When in the recording mode, this recording signal generation circuit 31 generates the above-mentioned five recording signals based on, for example, a 100-MHz master clock shown in FIG. 6(A) and NRZI signal shown in FIG. 6(B). The circuit 31 further comprises a channel clock sync pattern detection circuit 31a which judges, based on the NRZI signal, the length of the recording marks 3T to 11T, adjusts the delay time of each of variable delay elements 34, 37, 40 and 42 and thus determines a width of each pulse. The channel clock sync pattern detection circuit 31a similarly adjusts the delay time of each of variable delay elements 32, 35, 38 and 43 according to the judged recording mark length and thus sets a position of each pulse. The recording signal generation circuit 31 supplies the recording signal Data 1 to the variable delay element 32, NRZI pulse enable signal to a D flip-flop 33 and variable delay element 34, leading pulse enable signal to a D flip-flop 37 and variable delay element 37, pulse train enable signal to a D flip-flop 39, and the trailing pulse enable signal to a D flip-flop 41 and variable delay element 42.

Figure 6A:
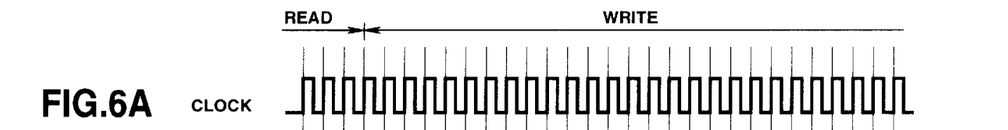
FIG. 6 is a timing chart showing the relationship between a master clock, NRZI (No Return to Zero Inverse) signal, recording signals Data 1, Data 2 and Data 3, output control signal Data 3', NRZI pulse and a multi-pulse.
Figure 6B:
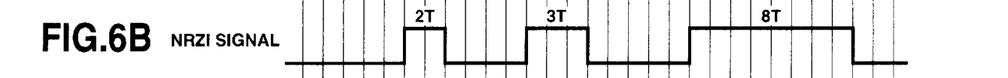
Figure 6C:
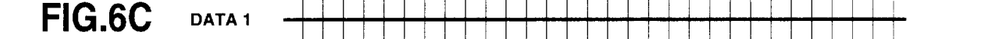

The variable delay element 32 delays the recording signal Data 1 a predetermined time and supplies it to the recording output control circuit 50. The recording signal Data 1 is a logic signal which is at H (high) level when the recording signal generation circuit 31 is in the recording or reproduction mode, and at L (low) level when no laser output is existent, as shown in FIG. 6(C).

Figure 6D:
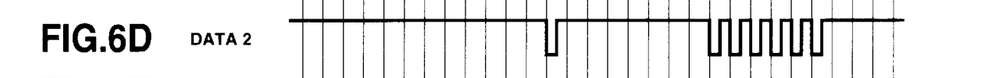
Figure 6E:
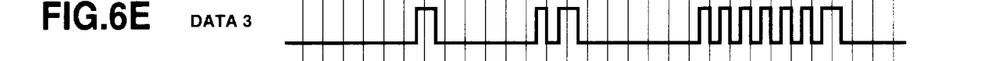
Figures 6F, 6G:
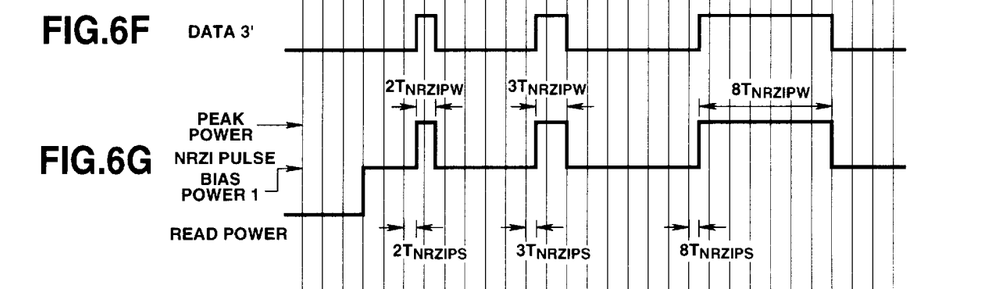

Receiving the NRZI pulse enable signal from the variable delay element 34 as a reset signal, the D flip-flop 33 clears the NRZI pulse enable signal from the recording signal generation circuit 31 and supplies it to the variable delay element 35 which will delay the NRZI pulse enable signal a predetermined time and supplies it as an output control signal Data 3' (NRZI pulse) to an OR gate 45 and recording output control circuit 50. The output control signal Data 3', namely, the NRZI pulse, is the NRZI signal in FIG. 6(B) delayed a predetermined time as shown in FIGS. 6(F) and 6(G). When the NRZI pulse length is 2T, 3T or 8T, its width is $2T_{NRZIPW}$, $3T_{NRZIPW}$ or $8T_{NRZIPW}$, respectively, which is determined by the variable delay element 34. The rise time of the NZRI pulse is delayed $2T_{NRZIPS}$, $3T_{NRZIPS}$ or $8T_{NRZIPS}$ from the NRZI signal of 2T, 3T or 8T, respectively, which is determined by the variable delay element 35. These NRZI pulses are used as output control pulse.

Receiving the leading pulse enable signal from the variable delay element 37 as a reset signal, the D flip-flop 36 clears the leading pulse enable signal from the recording signal generation circuit 31 and supplies it to the variable delay element 38 which will delay the leading pulse enable signal a predetermined time and supplies it to an OR gate 44.

Receiving the master clock from the variable delay element 40 as a reset signal, the D flip-flop 39 clears the pulse train enable signal from the recording signal generation circuit 31 and supplies it to the OR gate 44. The variable delay element 40 will delay the master clock from the recording signal generation circuit 31 a predetermined time and supplies it to the D flip-flop 39.

Receiving the trailing pulse enable signal from the variable delay element 42 as a reset signal, the D flip-flop 41 clears the trailing pulse enable signal from the recording signal generation circuit 31 and supplies it to the variable delay element 43 which will delay the trailing pulse enable signal a predetermined time and supplies it to the OR gate 44.

The OR gate 44 provides a logical sum of the pulses as the recording signal Data 3 and supplies it to the OR gate 45 and recording output control circuit 50. The recording signal Data 3 consists of a leading pulse, a train of n−1 pulses and a trailing pulse for a recording mark having a length nT (n: integer from 2 to 8 and T: channel clock width), as shown in FIG. 6(E). Note that for a recording mark having a length 2T, the recording signal Data 3 consists only of the leading pulse.

The OR gate 45 provides a logical sum of an inverted pulse of the output control signal Data 3' and the recording signal Data 3, and supplies it as a recording signal Data 2 to the recording output control circuit 50. The recording signal Data 2 is as shown in FIG. 6(D).

Figure 6H:
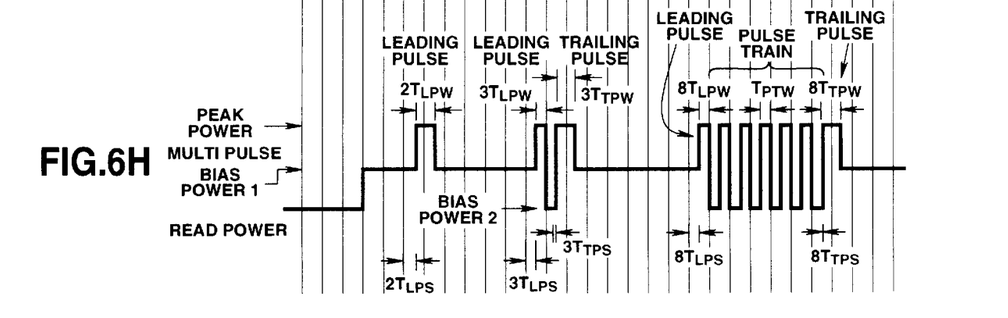

When supplied with the recording signals Data 1, Data 2 and Data 3 via the recording output control circuit 50, the semiconductor laser drive circuit 70 drives the semiconductor laser 3 to generate a laser light according to the multi-pulse shown in FIG. 6(H).

The aforementioned construction of the recording pulse generation circuit 30 is just an example, and it may be configured otherwise if it can generate the recording signals Data 1, Data 2 and Data 3 and the output control signal Data 3' shown in FIGS. 6(C) to 6(F).

Figure 7:
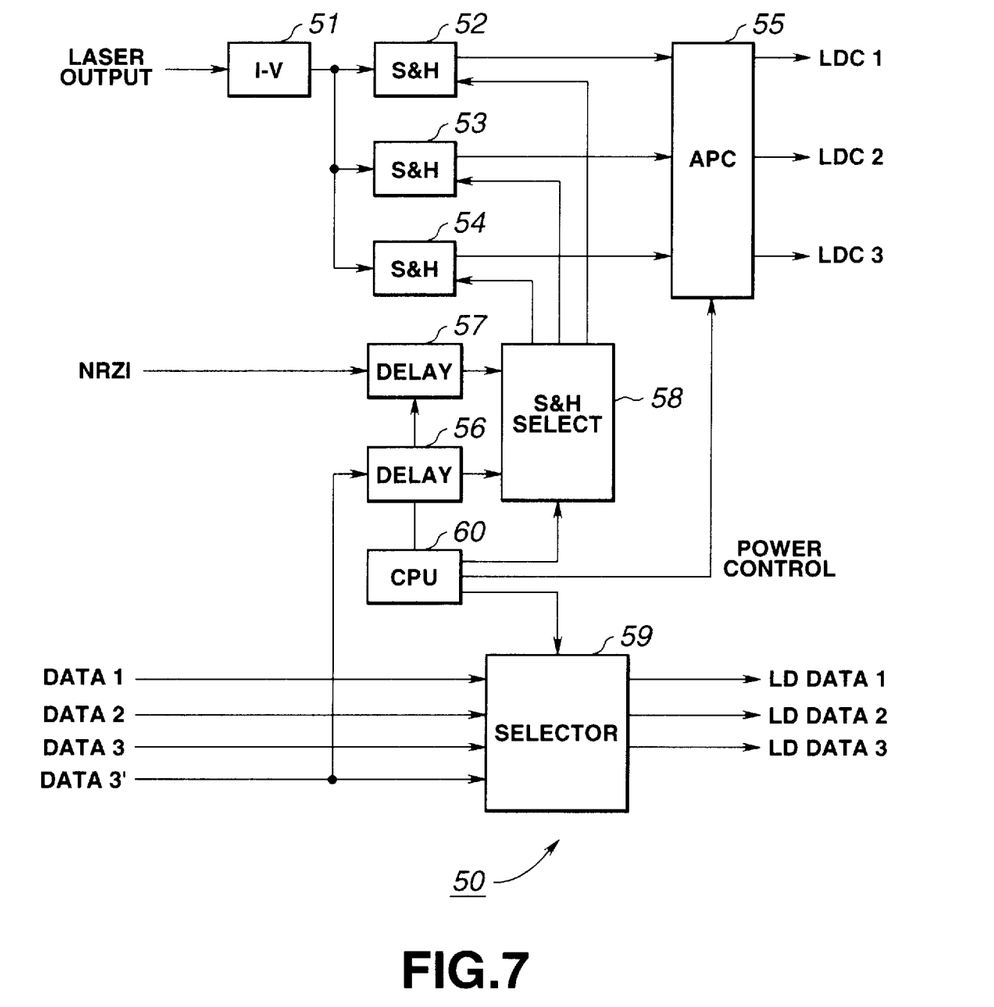
FIG. 7 is a schematic block diagram of a recording output control circuit used in the phase-change optical disc drive in FIG. 2.

As shown in FIG. 7, the recording output control circuit 50 comprises a photoelectric transducer circuit 51 which transduces a current detected by the laser power monitoring detector 9 shown in FIG. 2 to a voltage to provide a LD control signal LDC, sample and hold circuits 52, 53 and 54 which sample and hold the LD control signal LDC, APC circuit 55 to control the signal level of the LD control signal LDC, delay elements 56 and 57 to delay a predetermined signal, sampled and held pulse select circuit 58 (will be referred to as "S&H select circuit" hereinbelow) which selects and provides a sampled and held pulse from the predetermined signal, data selector 59 which selects a desired one of the recording signals Data 1 to output control signal Data 3' and supplies it to the semiconductor laser drive circuit 70, and a CPU (Central Processing Unit) 60 which controls the above circuits.

The photoelectric transducer circuit 51 supplies the sample and hold circuits 52, 53 and 54 with an LD control signal LDC obtained through the photoelectric transduction. The LD control signal LDC is detected a multi-pulse output obtained by the laser power monitoring detector 9.

The sample and hold circuits 52, 53 and 54 sample the LD control signal LDC when the sampled and held pulse supplied from the S&H select circuit 58 is at H level, and hold the LD control signal LDC when the sampled and held pulse is at L level. The sample and hold circuits 52, 53 and 54 supply such LD control signals LDC (LDC 1, LDC 2 and LDC 3, respectively) to the APC circuit 55.

The APC circuit 55 controls the LD control signals LDC 1, LDC 2 and LDC 3 separately to a predetermined level and supplies them to the semiconductor laser drive circuit 70. The levels of the LD control signals LDC 1, LDC 2 and LDC 3 are set by the CPU 60.

The LD control signal LDC 1 designates a reproduction power ("read power" in FIG. 6) at the time of data reproduction and an erasure power ("bias power 1" in FIG. 6) to erase data at the time of data recording. The LD control signal LDC 2 designates a cooling power ("bias power 2" in FIG. 6) at the time of data recording. The LD control signal LDC 3 designates a peak power ("peak power" in FIG. 6) at the time of data recording.

The S&H select circuit 58 provides a predetermined sampling pulse to the sample and hold circuits 52, 53 and 54 under the control of the CPU 60. The S&H select circuit 58 supplies the sample and hold circuits 52, 53 and 54 with a L- or H-level sampling pulse, inverts an NRZI signal supplied via the delay element 56 and supplies it to the sample and hold circuit 53, and supplies the sample and hold circuit 54 with the output control signal Data 3' (NRZI pulse) supplied via the delay elements 56 and 57.

Under the control of the CPU 60, the data selector 59 selects recording signals Data 1 to output control signal Data 3' and provide them as LD recording signals LD Data 1 to 3 or the LD recording signals LD Data 1 to 3 set to a predetermined level.

For example, when in the recording power control mode, the data selector 59 provides the recording signal Data 1 as LD recording signals LD Data 1, the LD recording signal LD Data 2 set to H level, and the output control signal Data 3' as LD recording signal LD Data 3. When in the ordinary recording mode, the data selector 59 provides the recording signal Data 1 as LD recording signal LD Data 1, the recording signal Data 2 as LD recording signal LD Data 2, and the recording signal Data 3 as LD control signal LDC 3. When in the reproduction mode, the data selector 59 provides the recording signal Data 1 as LD recording signal LD Data 1 and the recording signal Data 1 as LED recording signal LD Data 1 and the LD data signal 2 set to L level. At this time, the data selector 59 will provide no LD control signal LDC 3. When the semiconductor laser is off, the data selector 59 does not provide the LD recording signals LD Data 1 and 3 but provides the LED recording signal LD Data 2 set to L level When in the recording power control mode, the recording output control circuit 50 will adjust the LD control signals LDC 1, LDC 2 and LDC 3 as will be described below.

First, the data selector 59 provides the recording signal Data 1 as LD recording signal LD Data 1 and fixes the LD recording signals LD Data 2 and 3 to L level. The S&H select circuit 58 supplies the sample and hold circuit 52 with a sampled and held pulse at H level. The sample and hold circuit 52 supplies the APC circuit 55 with the LD control signals LDC from the photoelectric transducer circuit 51. The APC circuit 55 will set the LD control signal LDC 1 from the sample and hold circuit 52 to a predetermined level under the control of the CPU 60. After a level is set for the LD control signal LDC 1, the S&H circuit 58 supplies the sample and hold circuit 52 at the enable terminal thereof with sampled and held pulse at L level. Thus, the LD control signal LDC 1 is fixed at L level.

Next, the data selector 59 provides the recording signal Data 1 as LD recording signal LD Data 1 and the output control signal Data 3' as LD recording signal LD Data 3, and fixes the LD recording signal LD Data 2 to H level. The S&H select circuit 58 supplies an inverted one of the NRZI signal to the enable terminal of the sample and hold circuit 53. Therefore, the sample and hold circuit 53 samples an output of the bias power 1 part and supplies it as LD control signal LDC 2 to the APC circuit 55. Thus, the bias power 1 being a laser power of the multi-pulse is sampled by the sample and hold circuit 53 and controlled by the APC circuit 55 as will be discussed later.

The S&H select circuit 58 supplies an inverted one of the output control signal Data 3' (NRZI pulse) to the enable terminal of the sample and hold circuit 54. Therefore, the sample and hold circuit 54 samples the peak power of the multi-pulse and supplies it as LD control signal LDC 3 to the APC circuit 55. That is, the peak power being a laser power of the multi-pulse is sampled by the sample and hold circuit 54 and controlled by the APC circuit 55 as will be discussed later.

Since the bias power 2 of the multi-pulse has a same power as the read power, it is controlled based on a detected output of the RF signal during reproduction. The time of delay by the delay elements 56 and 57 corresponds to the time of delay by the semiconductor laser 3 and laser power monitoring detector 9 shown in FIG. 2.

The APC circuit 55 sets the LD control signals LDC 2 and LDC 3 to a predetermined level under the control of the CPU 60. The S&H select circuit 58 supplies the sample and hold circuits 53 and 54 with an L-level sampled and held pulse and fixes the LD control signals LDC 2 and LDC 3 to the L level.

After the LD control signals LDC 1 to LDC 3 are set, the recording output control circuit 50 shifts to the ordinary recording mode. At this time, the data selector 59 will provide the recording signal Data 1 as LD recording signal LD Data 1, the recording signal Data 2 as LD recording signal LD Data 2, and the recording signal Data 3 as LD recording signal LD Data 3.

As having been described in the foregoing, when in the recording power control mode, the recording output control circuit 50 supplies the semiconductor laser drive circuit 70 with the NRZI pulse shown in FIG. 6(G) as LD recording signal LD Data 3, the semiconductor laser 3 is caused to generate a light beam according to the NRZI pulse. The recording output control circuit 50 samples and holds, according to the NRZI pulse, a peak power of a light beam detected by the laser power monitoring detector 9, so it is possible to control the laser beam power even for a multi-pulse of less than 10 ns in width. After completion of this light beam power control, data is recorded.

Figure 8:
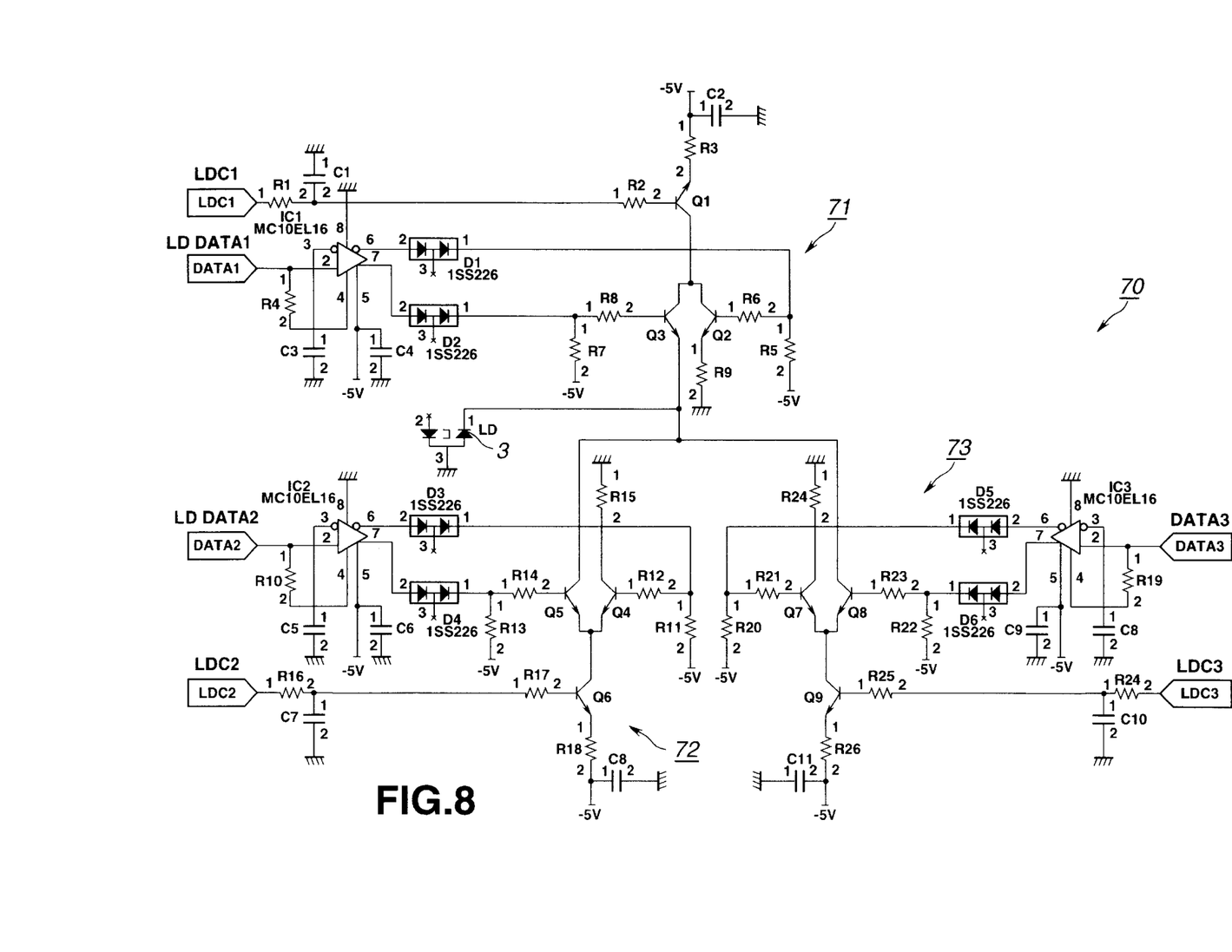
FIG. 8 is a schematic block diagram of a semiconductor laser drive circuit used in the phase-change optical disc drive in FIG. 2.

As shown in FIG. 8, the semiconductor laser drive circuit 70 comprises three current sources 71, 72 and 73 to supply a drive current to the semiconductor laser 3. In the semiconductor laser drive circuit 70, the current sources 71, 72 and 73 are selectively controlled according to three kinds of LD recording signals LD Data 1 to 3 supplied from the recording output control circuit 50 and LD control signals LDC 1 to LDC 3 corresponding to the LD recording signals to form a light waveform for the semiconductor laser 3.

The LD control signal LDC 1 controls the operation of the first current source 71, the LD control signal LDC 2 controls the operation of the second current source 72 and the LD control signal LDC 3 controls the operation of the third current source 73. Each of the LD control signals LDC is set to a predetermined value by the recording output control circuit 50, so that each of the currents from the first to third current sources 71 to 73 are set to a constant value. The semiconductor laser drive circuit 70 drives the semiconductor laser 3 to generate a multi-pulse according to the LD recording signals LD Data 1 to LD Data 3.

As having been described in the foregoing, the phase-change optical disc drive according to the present invention can sample and hold a peak power of a light beam detected by the laser power monitoring detector 9 according to the NRZI pulse when in the recording power control mode even for data recording at a user transfer rate higher than 30 Mbps, thereby controlling the laser power. Therefore, even during data recording in which the laser power may possibly vary under the influence of the return light from the optical disc 1, it is possible to stably control the peak power, bias power 1 and bias power 2 of the multi-pulse.

To implement the present invention, a recording output sampling area has to be provided on the optical disc 1 to control each output of the multi-pulse by generating an appropriate NRZI pulse (for example, repetition of a 3 T pattern).

However, the above recording output sampling area may also be buried in an ordinary recorded data to set and control a recording power without any special area provided on the optical disc 1. In this case, the multi-pulse and NRZI pulse are different from each other in the rates at which the optical disc 1 is heated or cooled. For aligning the leading and trailing edges of a recording mark with each other between the heating and cooling, appropriate methods of temperature compensation are available. The phase-change optical disc drive according to the present invention can control the pulse width to a predetermined value by the variable delay elements 34, 37, 40 and 42, respectively, and also the pulse position to a predetermined position by the variable delay elements 32, 35, 38 and 43, respectively. Namely, since the pulse width and laser irradiation position of the NRZI pulse and multi-pulse can be controlled correspondingly to recording marks 2T to 8T, respectively, the leading and trailing edges of the recording marks can be accurately controlled. That is, the quality of a reproduced signal will not be deteriorated.

It should be noted that the present invention is not limited only to the embodiment having been described in the foregoing. For example, the NRZI pulse is used as output control signal, but it may be a pulse having a larger width than the multi-pulse. Also, the present invention may easily be built along with a wider-band and high-speed APC circuit in a large scale integrated circuit, thereby permitting to design a more compact circuit.

As having been discussed in the foregoing, the recording/reproducing apparatus and method for a phase-change optical disc can control the multi-pulse power even at a high transfer rate by generating an output control pulse having a larger width than the multi-pulse when in the power control mode, causes the semiconductor laser to generate a light pulse according to the output control pulse, samples and holds the laser power detected by the detecting means according to the output control pulse and controlling the laser power of the semiconductor laser so that the sampled and held laser power has a predetermined value.

What is claimed is:

1. A phase-change optical disc drive in which a data of nT in pulse width is recorded with a multi-pulse generated from a semiconductor laser, including a number (n−1) of pulses and which shifts at a minimum of three, comprising:

means for detecting a laser power of the semiconductor laser; and means for generating, when in a power control mode, an output control pulse larger in pulse width than the multi-pulse to drive the semiconductor laser to generate a light pulse based on the output control pulse, sampling and holding, based on the output control pulse, the laser power detected by the detecting means, and controlling the laser power of the semiconductor laser so that the sampled and held laser power has a predetermined value.

2. The phase-change optical disc drive as set forth in claim 1, wherein the semiconductor laser generates NRZI pulse as the output control pulse.

3. The phase-change optical disc drive as set forth in claim 1, wherein the semiconductor laser sets the leading edge and width of the output control pulse according to the length of a mark to be recorded.

4. The phase-change optical disc drive as set forth in claim 1, wherein the semiconductor laser generates the output control pulse at a different timing from the leading edge of the multi-pulse.

5. A method of recording a data of nT in pulse width with a multi-pulse generated from a semiconductor laser, including a number (n−1) of pulses and which shifts at a minimum of three levels, comprising the steps of:

generating, when in a power control mode, an output control pulse larger in pulse width than the multi-pulse;

driving the semiconductor laser to generate a light pulse based on the output control pulse;

detecting a laser power of the semiconductor laser;

sampling and holding the detected laser power; and controlling the laser power of the semiconductor laser so that the sampled and held laser power has a predetermined value.

6. The method as set forth in claim 5, wherein NRZI pulse is generated as the output control pulse.

7. The method as set forth in claim 5, wherein there is generated an output pulse whose leading edge and width are set according to the length of a mark to be recorded.

8. The method as set forth in claim 5, wherein the output control pulse is generated at a different timing from the leading edge of the multi-pulse.

* * * * *